(12) United States Patent
Kim et al.

(10) Patent No.: US 7,981,543 B2
(45) Date of Patent: Jul. 19, 2011

(54) ELECTRODE WITH ENHANCED PERFORMANCE AND ELECTROCHEMICAL DEVICE COMPRISING THE SAME

(75) Inventors: Soo Jin Kim, Seoul (KR); Soon Ho Ahn, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 11/541,204

(22) Filed: Sep. 29, 2006

(65) Prior Publication Data
US 2007/0087267 A1   Apr. 19, 2007

(30) Foreign Application Priority Data
Sep. 29, 2005   (KR) .................. 10-2005-0091062

(51) Int. Cl.
*H01M 4/13* (2010.01)
(52) U.S. Cl. ..................................... 429/217; 427/209
(58) Field of Classification Search .............. 429/217, 429/209
See application file for complete search history.

(56) References Cited

U.S. PATENT DOCUMENTS

| | | | | |
|---|---|---|---|---|
| 5,616,366 A * | 4/1997 | Olsen et al. | ............. | 427/508 |
| 5,837,397 A * | 11/1998 | Xing | ............. | 429/162 |
| 5,846,674 A * | 12/1998 | Sakai et al. | ............. | 429/337 |
| 5,891,593 A * | 4/1999 | Keller et al. | ............. | 429/217 |
| 6,048,372 A * | 4/2000 | Mangahara et al. | ............. | 29/623.5 |
| 6,280,882 B1 * | 8/2001 | Vallee et al. | ............. | 429/303 |
| 6,327,136 B1 * | 12/2001 | Meguro et al. | ............. | 361/502 |
| 6,573,004 B1 * | 6/2003 | Igarashi et al. | ............. | 429/217 |
| 2002/0009649 A1 * | 1/2002 | Sato et al. | ............. | 429/306 |
| 2003/0175589 A1 * | 9/2003 | Kaminaka et al. | ............. | 429/218.1 |
| 2003/0180610 A1 * | 9/2003 | Felde et al. | ............. | 429/217 |
| 2004/0020763 A1 * | 2/2004 | Kanzaki et al. | ............. | 204/250 |

FOREIGN PATENT DOCUMENTS

| | | |
|---|---|---|
| CN | 1528028 | 9/2004 |
| KR | 1998019330 | 6/1998 |
| KR | 1020000048387 A | 7/2000 |
| KR | 20000075953 | 12/2000 |
| KR | 1020010100242 A | 11/2001 |
| KR | 1020040020632 A | 3/2004 |
| KR | 20050085315 | 8/2005 |
| WO | 2004079841 | 9/2004 |

OTHER PUBLICATIONS

Linden, David. "Handbook of Batteries" 2nd Edition. 1995. McGraw-Hill. 36.09-36.10.*

(Continued)

*Primary Examiner* — Barbara Gilliam
*Assistant Examiner* — Zachary Best
(74) *Attorney, Agent, or Firm* — Cantor Colburn LLP

(57) ABSTRACT

Disclosed is an electrode slurry comprising: (a) an electrode active material capable of lithium intercalation/deintercalation; and (b) monomers capable of forming a polymer via polymerization. An electrode having a binder polymer formed by applying the electrode slurry onto a current collector and carrying out in situ polymerization of the monomers, and an electrochemical device comprising the electrode are also disclosed. The electrode uses monomers capable of forming a binder polymer via polymerization under heat or light upon drying of the electrode, instead of the conventional PVdF or SBR-based binders. Therefore, it is possible to simplify a process for manufacturing an electrode, to provide an eco-friendly electrode by virtue of the use of an aqueous solvent as a dispersion medium, to improve the ion conductivity of a binder by virtue of the use of a solvent for a battery electrolyte as a dispersion medium, and thus to improve the quality of an electrochemical device.

17 Claims, 1 Drawing Sheet

OTHER PUBLICATIONS

English translation of Chinese Office Action for application No. 200680036481.5 dated Jun. 19, 2009.

International Search Report; PCT/KR2006/003923; Jan. 10, 2007.
Korean Office Action; Aug. 28, 2007.

* cited by examiner

ELECTRODE WITH ENHANCED PERFORMANCE AND ELECTROCHEMICAL DEVICE COMPRISING THE SAME

This application claims the benefit of the filing date of Korean Patent Application No. 2005-0091062, filed on Sep. 29, 2005, in the Korean Intellectual Property Office, the disclosure of which is incorporated herein in its entirety by reference.

TECHNICAL FIELD

The present invention relates to an eco-friendly electrode with improved quality, which is obtained in a simple manner by using monomers capable of forming a binder polymer polymerized upon drying during a process for manufacturing the electrode instead of a currently used polymeric binder. The present invention also relates to a method for manufacturing the electrode and an electrochemical device comprising the electrode.

BACKGROUND ART

Recently, as portable electronic instruments, such as portable computers, portable phones and camcorders, have been steadily developed so that they are downsized and lightened, lithium secondary batteries used as drive sources for the electronic instruments are also required to have compact size and light weight.

A lithium secondary battery includes a cathode, an anode and an electrolyte. Upon the first charge cycle, lithium ions are deintercalated from a cathode active material. Then, the lithium ions are intercalated into an anode active material, such as carbon particles, and are deintercalated from the anode active material upon discharge. In this manner, lithium ions transfer energy while they reciprocate between the cathode and the anode, thereby allowing the battery to be charged/discharged.

In general, an electrode for a lithium secondary battery is obtained by dissolving an electrode active material, a conductive agent, a binder, etc. into a dispersion medium to form an electrode slurry, and by applying the electrode slurry onto a current collector, followed by drying and pressing. Binders that are used conventionally are broadly classified into polyvinylidene difluoride (PVdF)-based binders and styrene-butadiene rubber (SBR)-based binders. Among these binders, polyvinylidene difluoride-based binders require the use on an non-aqueous toxic solvent, for example, N-methylpyrrolidone (NMP), as a dispersion medium for an electrode slurry, thereby potentially causing environmental pollution. Additionally, such binders may cause degradation of the quality of a battery, when the dispersion medium is not completely removed from the electrode slurry after applying the electrode slurry onto a current collector. Thus, an additional step for removing the dispersion medium is essentially required. Also, even after an electrode is finished, a polar electrolyte cannot infiltrate into electrode active material particles with ease to thus cause an increase in interfacial resistance in the electrode and an increase in internal resistance of a battery, resulting in degradation of the quality of the battery. Further, a long period of time and complicated processing conditions are required in order to allow a polar electrolyte to infiltrate into an electrode so that the electrode is wetted with the electrolyte. Under these circumstances, smooth lithium ion conduction cannot be made, resulting in degradation of the quality of a battery.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
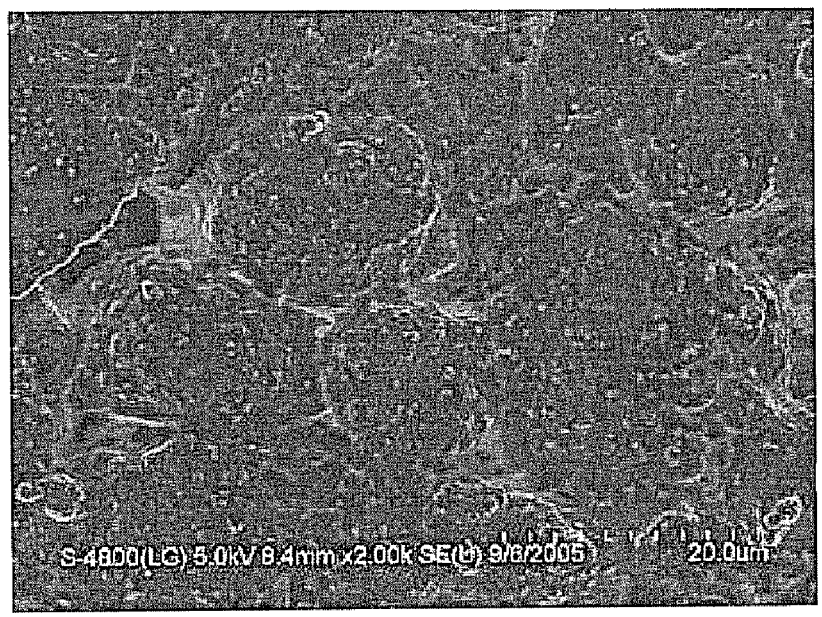
FIG. 1 is a photographic view taken by Scanning Electron Microscopy (SEM), which shows the surface of an electrode obtained from an electrode slurry comprising an electrode active material and monomers capable of forming a polymer via polymerization according to Example 1.

Therefore, the present invention has been made in view of the above-mentioned problems. The inventors of the present invention have found that when monomers capable of forming a binder polymer upon drying during a process for manufacturing an electrode are used instead of PVdF- and SBR-based binders, which cause environmental pollution and require a complicated electrode manufacturing process, it is possible to ensure the manufacture of an electrode having structural stability via a simple and eco-friendly process, and to improve the wettability and ion conductivity of an electrode and the quality of a battery due to the use of the solvent for a battery electrolyte as a dispersion medium.

Therefore, it is an object of the present invention to provide an electrode slurry comprising monomers capable of forming a binder polymer upon drying of an electrode, an electrode obtained from the electrode slurry, and an electrochemical device comprising the electrode.

According to an aspect of the present invention, there is provided an electrode slurry for battery comprising: (a) an electrode active material capable of lithium intercalation/deintercalation; and (b) monomers capable of forming a polymer via polymerization. According to another aspect of the present invention, there is provided an electrode having a binder polymer obtained by applying the electrode slurry onto a current collector and carrying out in-situ polymerization of the monomers. According to still another aspect of the present invention, there is provided an electrochemical device comprising the electrode.

According to yet another aspect of the present invention, there is provided an electrode obtained by using a solvent for a battery electrolyte as a dispersion medium for an electrode slurry, wherein the solvent for a battery electrode still remains in the finished electrode.

Hereinafter, the present invention will be explained in more detail.

The electrode according to the present invention is characterized by using monomers capable of forming a binder polymer with the lapse of time, upon drying of an electrode, or via exposure to light, instead of conventional PVdF- or SBR-based binders.

The electrode obtained by using such monomers is characterized by the following features but is not limited thereto.

Conventional solid-type binders such as PVdF- and SBR-based binders allow electrode active material particles to be interconnected and fixed with each other merely in a one-dimensional or two-dimensional structure, even if they are applied to an electrode slurry in the form of dispersion in a dispersion medium. Thus, in some cases, a part of the constitutional elements (e.g. an electrode active material, a conductive agent, or the like) forming the electrode may not be bound with the polymeric binders (see FIG. 2). As a result, during repeated charge/discharge cycles, such binders may lose the functions of interconnecting and fixing the constitutional elements of the electrode due to the swelling/shrinkage of the electrode active material, thereby causing rapid degradation of the quality of a battery.

On the contrary, according to the present invention, monomers having higher dispersibility than that of polymers are used for forming an electrode. Such monomers allow the whole constitutional element of an electrode to be uniformly distributed in an electrode slurry and can infiltrate uniformly into the whole constitutional element. When the monomers are subsequently subjected to polymerization in the presence of the constitutional elements to be interconnected by a binder, the elements are completely interconnected and fixed with each other by a three-dimensional network formed from the polymerized binder (see FIG. 1). Therefore, even if the electrode active material swells and shrinks during repeated charge/discharge cycles, the elements forming the electrode can be completely fixed and interconnected with each other by the three-dimensional network, and thus the battery can maintain its quality. Particularly, the monomers can form a binder polymer via in-situ polymerization upon drying of an electrode, and thus it helps to simplify the process for manufacturing an electrode.

There is no particular limitation in the monomer that may be used to form an electrode slurry according to the present invention, as long as the monomer can form a binder polymer with the lapse of time, upon drying of an electrode, or via exposure to light.

The monomer may comprise polymerizable reactive groups in the number of n ($1 \leq n \leq 8$), and N-, Si- or halogen-substituted or non-substituted linear and/or cyclic alkyl groups and alkyl oxide groups in a part other than the reactive groups. Herein, non-limiting examples of the polymerizable reactive group include (meth)acrylate, acrylonitrile, anhydride, styrene, epoxy, isocyanate, or the like. In addition, vinyl group-containing monomers crosslinkable by an initiator or light may be used. The above monomers may also be used in combination.

There is no particular limitation in the type and molecular weight of the monomer. For example, the monomer may have a molecular weight of 50~1,500 and a viscosity of 1~20,000 cps. If possible, monomers having at least one polar group per molecule and showing a certain viscosity are preferred in order to increase the compatibility with a solvent used in a battery, since such monomers show high affinity to a carbonate-based compound as a solvent currently used in a battery. Liquid type monomers having a certain viscosity are more preferred.

As mentioned above, conventional PVdF-based binders are problematic in that they may cause environmental pollution due to the use of an non-aqueous toxic solvent (e.g. N-methyl-2-pyrrolidone, NMP) as a dispersion medium for an electrode slurry, and require an additional step of completely removing the dispersion medium. Additionally, since SBR-based binders require the use of water as a dispersion medium for an electrode slurry, they are problematic in that the water used as a dispersion medium may cause many electrochemical side reactions in a battery. Thus, in order to ensure the quality of a battery by overcoming such side reactions, an additional step for completely removing water is required.

As compared to the conventional polymeric binders, the electrode according to the present invention uses high-viscosity monomers having an affinity similar to the affinity of a conventional carbonate-based solvent, so that various non-aqueous solvents and aqueous solvents as well as conventional solvents for battery electrolytes can be used as dispersion media (see Table 1). Therefore, complete removal of a dispersion medium is not required when manufacturing a battery, thereby improving the simplicity and productivity of a process for manufacturing an electrode.

Additionally, in the conventional electrodes, a polar electrolyte cannot infiltrate into electrode active material particles due to a difference in affinity between a binder polymer and a solvent for a battery electrolyte, thereby causing an increase in interfacial resistance of an electrode and an increase in internal resistance of a battery, resulting in degradation of the quality of a battery. Further, a long period of time and complicated processing conditions are required in order to allow a polar electrolyte to infiltrate into an electrode so that the electrode is wetted with the electrolyte. Therefore, smooth lithium ion conduction cannot be made, resulting in degradation of the quality of a battery.

On the contrary, according to the present invention, a constitutional solvent currently used to form a battery electrolyte can be used as a dispersion medium by virtue of the monomers. Also, it is possible to obtain an electrode with no need for removing a dispersion medium completely. Therefore, since the electrode according to the present invention originally contains a constitutional solvent of an electrolyte before the electrolyte is injected into a battery, it is possible to improve the wettability and ion conductivity of an electrode and to accomplish smooth lithium ion conduction and transfer between an electrode and an electrolyte, and thus to improve the quality of a battery.

Non-limiting examples of the monomer that may be used in the present invention include methyl (meth)acrylate, 2-carboxyethyl(meth)acrylate, 2-hydroxyethyl(meth)acrylate, 1,3-butylene glycol di(meth)acrylate, 1,4-butanediol di(meth)acrylate, 1,6-hexanediol di(meth)acrylate, dipropylene glyocl di(meth)acrylate, tricyclodecane dimethanol diacrylate ethoxylated bisphenol A dimethacrylate, tripropylene glycol di(meth)acrylate, dipentaerythritol penta(meth)acrylate, pentaerythritol tetra(meth)acrylate, propoxylated (3) trimethylpropane triacrylate, tris(2-hydroxy ethyl) isocyanurate triacrylate, 2-phenoxyethyl methacrylate, dipentaerythritol hexa(meth)acrylate, tolylene 2,4-diisocyanate, 1,4-phenylene diisocyanate, 1,6-hexamethylene diisocyanate, isophorone diisocyanate, bisphenol A type epoxy, novolak epoxy, epoxidized olefin, tetraphenylol ethane type epoxy, 4-methylol resorcinol glycidyl ether, or a mixture thereof.

There is no particular limitation in the content of the monomer, and the monomer may be used preferably in an amount of 1~30 parts by weight per 100 parts by weight of an electrode slurry. If the monomer is used in an amount less than 1 part by weight, the resultant electrode may lack structural stability. On the other hand, if the monomer is used in an amount greater than parts by weight, it may cause degradation of the capacity and quality of a battery.

The other constitutional element for forming the electrode slurry is an electrode active material, i.e. a cathode active material or an anode active material, known to those skilled in the art.

Particularly, the cathode active material may include any conventional cathode active material currently used in a cathode of a conventional electrochemical device. Particular non-limiting examples of the cathode active material include lithium intercalation materials such as lithium manganese oxides, lithium cobalt oxides, lithium nickel oxides, lithium iron oxides or composite oxides thereof. Additionally, the anode active material may include any conventional anode active material currently used in an anode of a conventional electrochemical device. Particular non-limiting examples of the anode active material include lithium intercalation materials such as lithium metal, lithium alloys, carbon, petroleum coke, activated carbon, graphite, Si or other carbonaceous materials. Other metal oxides capable of lithium intercalation/deintercalation and having a potential vs. lithium potential of less than 2V may be used, such as metal oxides including $TiO_2$, $SnO_2$ or $Li_4Ti_5O_{12}$.

The electrode slurry according to the present invention may comprise a polymerization initiator.

Any compound capable of causing radical generation may be used as a polymerization initiator. Particular examples of the initiator that may be used in the present invention include: peroxide-based initiators such as initiators having a peroxyester, peroxycarbonate, hydroperoxide, peroxy ketal, ketone peroxide or dialkyl peroxide structure; azo-based initiators such as initiators having an azonitrile, azoester or azoamine structure; and bases that cause epoxy polymerization. Additionally, in order to control the gel content of the resultant binder particles, at least two polymerization additives generally known to those skilled in the art, for example, a molecular weight modifier and/or a crosslinking agent may be used in combination.

In addition to the above elements, the electrode slurry according to the present invention may further comprise conventional additives for an electrode, for example, a conductive agent, a viscosity modifier, a supplementary binder, etc. Particularly, the electrode slurry according to the present invention may comprise a solvent for a conventional battery electrolyte as a dispersion medium.

As the dispersion medium, any solvent for a battery generally known to those skilled in the art may be used with no particular limitation. For example, carbonate-based and/or ester-based solvents may be used and non-limiting examples thereof include ethylene carbonate (EC), propylene carbonate (PC), gamma-butyrolactone (GBL), diethyl carbonate (DEC), dimethyl carbonate (DMC), ethyl methyl carbonate (EMC), methyl propyl carbonate (MPC) or a mixture thereof.

As the conductive agent, any electroconductive material that causes no chemical change in a finished battery may be used. For example, carbon black such as acetylene black, ketjen black, furnace black or thermal black, natural graphite, artificial graphite, conductive carbon fiber, etc. may be used. Particularly, carbon black, graphite powder and carbon fiber are preferred.

As the viscosity modifier, polymers such as carboxymethyl cellulose, carboxyethyl cellulose, ethyl cellulose, hydroxymethyl cellulose, hydroxypropyl cellulose, carboxyethylmethyl cellulose, polyethylene oxide, ethylene glycol, etc. may be used.

Also, the present invention provides an electrode having a binder polymer formed by applying the above electrode slurry onto a current collector and carrying out in-situ polymerization of the monomers.

As described above, the electrode is structurally characterized in that electrode active material particles are interconnected and fixed with each other in a three-dimensional network formed by the in-situ polymerized binder polymer (see FIG. 1).

The polymerization of the monomers may be carried out by irradiating light or heat thereto or with the lapse of time during a drying step of an electrode, but is not limited thereto. Additionally, the binder polymer formed by the polymerization may take the form of a gel polymer comprising a dispersion medium, such as a solvent for a battery electrolyte, incorporated in the binder polymer itself. Therefore, since the binder contains an electrolyte therein while forming a three-dimensional network, the electrode may have improved ion conductivity due to the ion conductivity of the battery electrolyte, and thus lithium ion conduction and transfer between the electrolyte and the electrode are significantly improved, resulting in improvement of the quality of a battery. Herein, if the binder has ion conductivity, it is possible to obtain a synergic effect of improving the ion conductivity of the electrode.

The electrode according to the present invention may be manufactured by a conventional method known to those skilled in the art, except that the binder polymer is formed via in-situ polymerization of the monomers. In one embodiment of the method, an electrode slurry comprising an electrode active material and polymerizable monomers is applied onto a current collector, and then the collector coated with the electrode slurry is dried to perform the polymerization of the monomers.

There is no particular limitation in the current collector, as long as the collector is formed of a conductive material. In the case of a cathode collector, foil formed of aluminum, nickel or a combination thereof is preferred. In the case of an anode collector, foil formed of copper, nickel, copper alloys or a combination thereof is preferred. As mentioned above, the electrode slurry may comprise a solvent for a battery electrolyte as a dispersion medium.

Also, there is no particular limitation in temperature and time required for drying the electrode, as long as the temperature and time conditions allow polymerization of the monomers to form a binder polymer. Particularly, it is preferable that the dispersion medium is not completely removed. However, the method for manufacturing the electrode according to the present invention may further comprise an additional step of completely removing the dispersion medium.

Further, the present invention provides an electrochemical device comprising a cathode, an anode, a separator interposed between both electrodes and an electrolyte, wherein one of or both the cathode and the anode are the electrodes having a binder polymer formed via in-situ polymerization of the monomers upon drying of the electrode.

The electrochemical device includes any device in which electrochemical reactions are performed. Particular examples of the electrochemical device include all kinds of primary batteries, secondary batteries, fuel cells, solar cells, capacitors, or the like. Preferably, the electrochemical device is a secondary battery, more preferably a lithium secondary battery, such as a lithium metal secondary battery, a lithium ion secondary battery, a lithium polymer secondary battery or a lithium ion polymer secondary battery.

A method of preparing the electrochemical device using the electrode produced as described above may be performed by any conventional method known in the art. In one embodiment of the method, the separator is interposed between the two electrodes to form an assembly into which the electrolyte solution is then injected.

Preferably, the electrochemical device obtained as described above is a lithium secondary battery, including a lithium metal secondary battery, a lithium ion secondary battery, a lithium polymer secondary battery or a lithium ion polymer secondary battery.

Although there is no particular limitation in the separator that may be used in the present invention, a porous separator may be used, and particular examples thereof include polypropylene-based, polyethylene-based, and polyolefin-based porous separators.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and B— represents an anion selected from the group consisting of $PF_6^-$, $BF_4^-$, $Cl^-$, $Br^-$, $I^-$, $ClO_4^-$, $ASF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL) and mixtures thereof. However, the electrolyte that may be used in the present invention is not limited to the above examples.

Further, although there is no particular limitation in the outer shape of the electrochemical device, preferably lithium secondary battery obtained by the above method, the electrochemical device may be a cylindrical, prismatic, pouch-type or coin-type electrochemical device.

Further, the present invention provides an electrode obtained by using a solvent for a battery electrolyte as a dispersion medium for an electrode slurry, wherein the solvent for a battery electrolyte still remains in a finished electrode.

Herein, the electrode can activate electrochemical reactions occurring in a battery via lithium ion conduction by virtue of the improved wettability of the electrode with the electrolyte solvent contained in the electrode itself, and thus can improve the quality of the battery.

BEST MODE FOR CARRYING OUT THE INVENTION

Reference will now be made in detail to the preferred embodiments of the present invention. However, the following examples and comparative examples are illustrative only, and the scope of the present invention is not limited thereto.

Example 1

Manufacture of Anode for Lithium Secondary Battery Using Acrylate Monomers

First, 88.6 parts by weight of carbon powder as an anode active material, 10 parts by weight of pentaacrylate monomers having a viscosity of 13,600 cps and a molecular weight of 525 g/mol, 0.4 parts by weight of an azo type initiator, and 1 part by weight of carbon black as a conductive agent were added to 30 parts by weight of a mixed solvent containing ethyl carbonate and propylene carbonate in a weight ratio of 1:1 (EC:PC) to form an anode slurry. Then, the anode slurry was applied onto a copper (Cu) thin film having a thickness of 10 µm as an anode collector, then the coated collector was dried at 130° c. for 15 minutes to provide an anode. The resultant binder polymer was a gel polymer containing EC and PC incorporated therein.

Example 2

Manufacture of Anode for Lithium Secondary Battery Using Mixed Acrylate/Isocyanate Monomers An anode was provided in the same manner as described in Example 1, except that 7 parts by weight of pentaacrylate monomers having a viscosity of 13,600 cps and a molecular weight of 525 g/mol, 2 parts by weight of diisocyanate monomers having a molecular weight of 174 g/mol and 1 part by weight of acrylate monomers end-capped with alcohol groups were used as monomers for forming the anode. Like the binder polymer of Example 1, the resultant binder polymer was a gel polymer containing EC and PC incorporated therein.

Example 3

Manufacture of Anode for Lithium Secondary Battery Using Epoxy Reactive Monomers An anode was provided in the same manner as described in Example 1, except that 89 parts by weight of carbon powder as an anode active material, 7 parts by weight of poly(ethylene glycol) diglycidyl ether monomers having a viscosity of 13,600 cps and a molecular weight of 540 g/mol, 3 parts by weight of an amine curing agent and 1 part by weight of carbon black as a conductive agent were used. Like the binder polymer of Example 1, the resultant binder polymer was a gel polymer containing EC and PC incorporated therein.

Comparative Example 1

An electrode was provided in the same manner as described in Example 1, except that PVdF binder was used instead of the monomers capable of forming a polymer.

Experimental Example 1

Evaluation for Surface of Electrode

The following test was performed to evaluate the surface of the electrode according to the present invention.

The electrode according to Example 1 was used as a sample, while the electrode using the PVdF binder according to Comparative Example 1 was used as a control.

Figure 2:
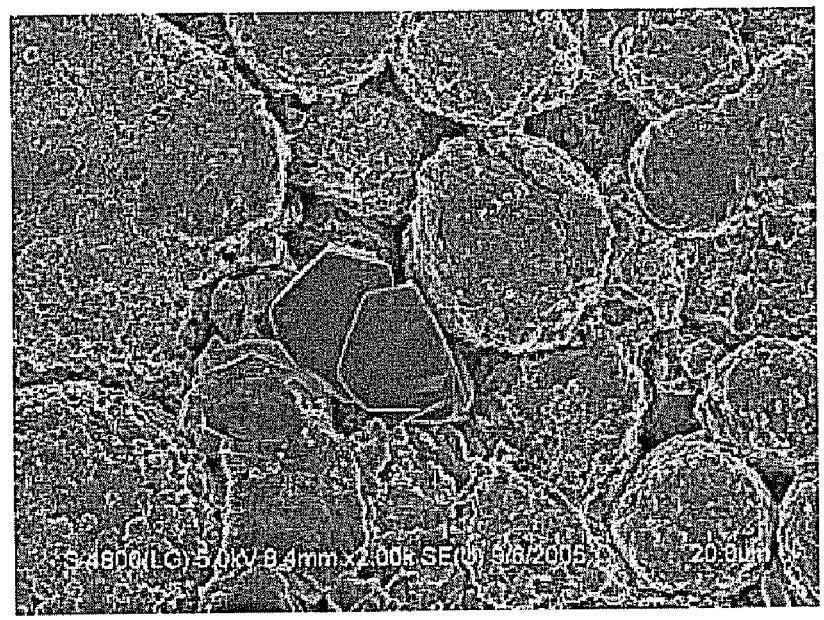
FIG. 2 is a photographic view taken by Scanning Electron Microscopy (SEM), which shows the surface of an electrode obtained from an electrode slurry comprising an electrode active material and a polymeric binder (PVdF) according to Comparative Example 1.

After observing the surface of each electrode with a scanning electron microscope (SEM), the electrode using the conventional PVdF binder according to Comparative Example 1 was shown to have non-bound electrode active material particles, and the binder was merely coated on the surface of the electrode active material (see FIG. 2). On the contrary, it was shown that the electrode using monomers capable of forming a polymer via polymerization according to Example 1 had no non-bound electrode active material particles, and the binder formed a three-dimensional network structure so that the whole active material was bound in the form of a single layer in the three-dimensional network (see FIG. 1).

Experimental Example 2

Evaluation for Dispersibility of Binders

The following test was performed to evaluate the dispersibility of a material used as a binder for an electrode in a solvent.

The acrylate monomer (viscosity of 13,600 cps), the isocyanate monomer and the epoxy monomer used in Examples 1, 2 and 3, respectively, were used as samples. As controls, conventional binders for electrodes, i.e. PVdF and SBR binders were used. Each material was introduced into an aqueous solvent, an non-aqueous solvent, i.e. NMP, and a carbonate-based solvent to determine the dispersibility of each material.

Herein, dispersibility was measured by determining whether or not each binder-forming material existed as a single phase with the above solvents.

After the test, it can be seen that the conventional binders, i.e. PVdF and SBR binders are dispersed selectively in NMP and water, respectively, while the monomers used according to the present invention can be dispersed uniformly in all the solvents. Particularly, it can be also seen that the monomer has excellent dispersibility to a carbonate-based solvent currently used as a solvent for a battery electrolyte, and thus can be applied as a dispersion medium for an electrode slurry (see Table 1).

TABLE 1

|  | Water ($H_2O$) | NMP | Carbonate-based solvent |
| --- | --- | --- | --- |
| Acrylate monomer | ○ | ○ | ○ |
| Isocyanate monomer | ▽ (saturation amount exists) | ○ | ○ |
| Epoxy monomer | X | ○ | ○ |
| SBR solution (dissolved in water) | ○ | ○ | ○ |
| PVdF | X | ○ | X |

Experimental Example 3

Evaluation for Wettability of Electrode

The following test was performed to evaluate the wettability of the electrode according to the present invention.

The anodes according to Examples 1, 2 and 3 were used as samples, and each sample was measured for its contact angle to an electrolyte by using a contact angle measuring system. The electrolyte used in this test was a mixed solvent formed of ethylene carbonate/propylene carbonate/diethyl carbonate (EC:PC:DEC=30:20:50) containing 1M lithium hexafluorophosphate (LiPF6) dissolved therein. At this time, the acrylate monomers caused polymerization upon drying. Additionally, a conventional PVdF binder for an electrode was used as a control.

As used herein, the term "contact angle" refers to the angle of an interface generated by a thermodynamic equilibrium state formed when a liquid substance, such as an electrolyte, is in contact with another immiscible substance, such as a binder. In the present invention, the contact angle is used as a measure indicating the wettability of a solid surface, caused by a surface energy difference due to hydrophilicity or hydrophobicity. In this test, the contact angle is defined as the contact angle measured 0.1 second after dropping the electrolyte onto the binder. This is because a contact angle is varied when the electrolyte infiltrates into the binder composition or evaporates to the air.

After the test, it can be seen that the PVdF binder according to Comparative Example 1 requires 238 seconds to allow the electrolyte absorption, while the electrode binder according to the present invention requires a significantly reduced period of time, which is about ⅕ based on the electrolyte absorption time measured in the case of the PVdF binder (see Table 2). Additionally, according to the present invention, the contact angle, i.e. the angle of the interface formed between the electrolyte and the binder is such low that it is not measurable. Therefore, it can be expected that the electrode according to the present invention having excellent wettability can activate electrochemical reactions occurring in the electrode, including smooth lithium ion conduction and transfer into the lattice of the electrode active material, and thus can improve the quality of a battery.

TABLE 2

|  | Electrolyte absorption time (s) | Contact angle (°) |
| --- | --- | --- |
| Comp. Ex. 1 | 238 | 35.6 |
| Ex. 1 | 47.2 | Not measurable |
| Ex. 2 | 47.8 | Not measurable |
| Ex. 3 | 63.7 | Not measurable |

INDUSTRIAL APPLICABILITY

As can be seen from the foregoing, the electrode according to the present invention comprises monomers capable of forming a binder polymer via polymerization upon drying of the electrode. Therefore, it is possible to simplify a process for manufacturing the electrode, to provide an eco-friendly electrode, to improve the wettability of an electrode and ion conductivity of a binder, and thus to improve the quality of an electrochemical device.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. An electrode slurry for a battery, the electrode slurry consisting essentially of:
    (a) an electrode active material capable of lithium intercalation/deintercalation;
    (b) a binder consisting of monomers capable of forming a polymer via polymerization and having a polymerizable reactive group in the number of ($1 \leq n \leq 8$), wherein the monomers have a molecular weight of 50 to 1,500 and a viscosity adjusted to be within 1 to 20,000 cps, respectively, and a polymerization initiator;
    (c) a conductive agent; and
    (d) a carbonate-based solvent.

2. The electrode slurry according to claim 1, wherein the monomer comprises polymerizable reactive groups in the number of n ($1 \leq n \leq 8$), the reactive group being selected from the group consisting of (meth)acrylate, acrylonitrile, anhydride, styrene, epoxy, isocyanate and vinyl groups.

3. The electrode slurry according to claim 1, wherein the monomer is at least one monomer selected from the group consisting of: methyl (meth)acrylate, 2-carboxyethyl(meth) acrylate, 2-hydroxyethyl(meth)acrylate, 1,3-butylene glycol di(meth)acrylate, 1,4-butanediol di(meth)acrylate, 1,6-hexanediol di(meth)acrylate, dipropylene glycol di(meth)acrylate, tricyclodecane dimethanol diacrylate ethoxylated bisphenol A dimethacrylate, tripropylene glycol di(meth) acrylate, dipentaerythritol penta(meth)acrylate, pentaerythritol tetra(meth)acrylate, propoxylated (3) trimethylpropane triacrylate, tris(2-hydroxy ethyl) isocyanurate triacrylate, 2-phenoxyethyl methacrylate, and dipentaerythritol hexa(meth)acrylate.

4. The electrode slurry according to claim 1, wherein the monomer is at least one monomer selected from the group consisting of: tolylene 2,4-diisocyanate, 1,4-phenylene diisocyanate, 1,6-hexamethylene diisocyanate, and isophorone diisocyanate.

5. The electrode slurry according to claim 1, wherein the monomer is at least one monomer selected from the group consisting of: bisphenol A epoxy, novolak epoxy, epoxidized olefin, tetraphenylol ethane epoxy, and 4-methylol resorcinol glycidyl ether.

6. An electrode comprising a binder polymer formed by applying the electrode slurry as defined in claim 1 onto a current collector and carrying out in-situ polymerization of the monomers, wherein the binder polymer contains carbonate-based solvents incorporated therein before an electrolyte comprising carbonate-based solvents is injected into a battery.

7. The electrode according to claim 6, wherein the polymerization of the monomers is performed by way of time, heat or light during a step for drying the electrode.

8. The electrode according to claim 6, wherein the electrode active material particles are interconnected and fixed with each other in a three-dimensional network of the binder polymer formed by the in-situ polymerization.

9. The electrode according to claim 6, which is obtained by applying an electrode slurry comprising an electrode active material, polymerizable monomers and a dispersion medium onto a current collector and carrying out polymerization of the monomers by drying, wherein the dispersion medium is not completely removed upon drying.

10. An electrochemical device comprising a cathode, an anode, a separator and an electrolyte, wherein one of or both the cathode and the anode are the electrodes as defined in claim 6.

11. The electrochemical device according to claim 10, which is a lithium secondary battery.

12. The electrode according to claim 6, which activates electrochemical reactions occurring in the electrode via lithium ion conduction, due to the wettability of the electrode improved by the solvent for a battery electrolyte contained in the electrode.

13. A method of forming an electrode, the method comprising:
mixing a composition consisting essentially of
an electrode active material,
a binder consisting of a monomer capable of forming a polymer, wherein the monomer has 1 to 8 polymerizable reactive groups, a molecular weight of 50 to 1,500 and a viscosity of 1 to 20,000 cps, respectively, and a polymerization initiator,
carbon black, and
a carbonate solvent to form a mixture;
coating the mixture to form a coating; and
polymerizing the monomers by drying the coating.

14. The electrode slurry according to claim 1,
wherein the monomers are pentaacrylate monomers, and
wherein the carbonate-based solvent is a combination of ethyl carbonate and propylene carbonate.

15. The electrode slurry according to claim 1,
wherein the monomers are a combination of pentaacrylate monomers, diisocyanate monomers, and acrylate monomers, and
wherein the carbonate-based solvent is a combination of ethyl carbonate and propylene carbonate.

16. The electrode slurry according to claim 1,
wherein the monomers are poly(ethylene glycol) diglycidyl ether monomers, and
wherein the carbonate-based solvent is a combination of ethyl carbonate and propylene carbonate.

17. An electrode slurry for a battery, the electrode slurry consisting of:
(a) an electrode active material capable of lithium intercalation/deintercalation;
(b) monomers capable of forming a polymer via polymerization and having a polymerizable reactive group in the number of ($1 \leq n \leq 8$),
wherein the monomers have a molecular weight of 50 to 1,500 and a viscosity adjusted to be within 1 to 20,000 cps, respectively;
(c) a conductive agent; and
(d) a carbonate-based solvent.

* * * * *